(12) United States Patent
Wang et al.

(10) Patent No.: US 11,909,461 B2
(45) Date of Patent: Feb. 20, 2024

(54) INFORMATION TRANSMISSION METHOD AND COMMUNICATION APPARATUS

(71) Applicant: Huawei Technologies Co., Ltd., Shenzhen (CN)

(72) Inventors: Bo Wang, Dongguan (CN); Chaoyi Yan, Dongguan (CN); Zezhou Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 17/389,861

(22) Filed: Jul. 30, 2021

(65) Prior Publication Data

US 2021/0359719 A1 Nov. 18, 2021

Related U.S. Application Data

(63) Continuation of application No. PCT/CN2020/073783, filed on Jan. 22, 2020.

(30) Foreign Application Priority Data

Feb. 2, 2019 (CN) .......................... 201910106927.6

(51) Int. Cl.
*H04B 3/52* (2006.01)
*H04W 80/02* (2009.01)
(Continued)

(52) U.S. Cl.
CPC .............. *H04B 3/52* (2013.01); *H04W 80/02* (2013.01); *H04W 92/20* (2013.01); *H04W 84/042* (2013.01)

(58) Field of Classification Search
CPC ........ H04B 3/52; H04W 80/02; H04W 92/20; H04W 84/042; H04W 36/0009;
(Continued)

(56) References Cited

U.S. PATENT DOCUMENTS 10,149,253 B2 12/2018 Chen et al.
2014/0155066 A1 6/2014 Guo et al.
(Continued)

FOREIGN PATENT DOCUMENTS

CN 101159933 A 4/2008
CN 101232651 A 7/2008
(Continued)

*Primary Examiner* — David S Huang
(74) *Attorney, Agent, or Firm* — SLATER MATSIL, LLP (57) ABSTRACT

A communication apparatus acting as a baseband unit (BBU) or being applicable to a BBU, and having instructions for obtaining first coordination information to be sent to a second BBU, determining, based on preset link information, a transmission link corresponding to the second BBU, the transmission link including a first remote radio unit (RRU) and a second RRU, the first RRU belonging to the BBU, the second RRU belonging to the second BBU, and the first RRU and the second RRU being connected through a wired link, sending the first coordination information to the first RRU, sending indication information to the first RRU, the indication information indicating to the first RRU to send the first coordination information to the second RRU through the wired link, the indication information having an identifier of the second RRU.

20 Claims, 8 Drawing Sheets

(51) Int. Cl.
*H04W 92/20* (2009.01)
*H04W 84/04* (2009.01)

(58) Field of Classification Search
CPC ... H04W 84/005; H04W 88/085; H04W 4/42; H04W 36/0011; H04W 36/0055; H04W 56/001; H04W 84/22
See application file for complete search history.

(56) References Cited

U.S. PATENT DOCUMENTS

| | | | |
|---|---|---|---|
| 2015/0237571 A1* | 8/2015 | Laraqui | H04W 24/10 370/332 |
| 2017/0272931 A1 | 9/2017 | Bottari et al. | |
| 2020/0008125 A1* | 1/2020 | Pennington | H04W 40/02 |

FOREIGN PATENT DOCUMENTS

| | | |
|---|---|---|
| CN | 102136868 A | 7/2011 |
| CN | 102611602 A | 7/2012 |
| CN | 103580978 A | 2/2014 |
| EP | 2866388 A1 | 4/2015 |
| IN | 104038999 A | 9/2014 |
| JP | 2010206737 A | 9/2010 |
| JP | 2017188812 A | 10/2017 |
| WO | 2017070635 A1 | 4/2017 |
| WO | 2018090854 A1 | 5/2018 |

* cited by examiner

INFORMATION TRANSMISSION METHOD AND COMMUNICATION APPARATUS

CROSS-REFERENCE TO RELATED APPLICATIONS

This application is a continuation of International Application No. PCT/CN2020/073783, filed on Jan. 22, 2020, which claims priority to Chinese Patent Application No. 201910106927.6, filed on Feb. 2, 2019. The disclosures of the aforementioned applications are hereby incorporated by reference in their entireties.

TECHNICAL FIELD

This application relates to the communication field, and in particular, to an information transmission method and a communication apparatus.

BACKGROUND

In a high-speed railway scenario, as locomotives pass through different cells, cell handover need to be frequently performed for a large quantity of mobile terminals. Therefore, a large amount of user data needs to be exchanged between cells. Currently, information is exchanged between cells over an external transmission network (including network devices such as a plurality of switches and routers) based on an external interface (for example, an X2 interface between baseband units (BBUs)) between baseband units (BBUs) of the cells. Due to a limitation of a transmission feature of the X2 interface, when a large amount of user data is exchanged between the BBUs, congestion occurs on the X2 interface between the BBUs, and a transmission delay of the external transmission network is relatively large. Therefore, validity and timeliness of the user data are greatly affected, and consequently handover may easily fail.

SUMMARY

This application provides an information transmission method and a communication apparatus, to improve transmission performance of coordination information between BBUs.

According to a first aspect, this application provides an information transmission method, where the method includes a first BBU obtains first coordination information to be sent to a second BBU. The first BBU determines, based on preset link information, a transmission link corresponding to the second BBU, where the transmission link includes a first remote radio unit (RRU) and a second RRU, the first RRU belongs to the first BBU, the second RRU belongs to the second BBU, and the first RRU and the second RRU are connected through a wired link. The first BBU sends the first coordination information to the first RRU, to send the first coordination information to the second BBU through the transmission link.

Based on the information transmission method provided in this application, the wired link is established between the first RRU belonging to the first BBU and the second RRU belonging to the second BBU, to provide a wired transmission link for exchange of coordination information between the first BBU and the second BBU. Therefore, when the first BBU sends the first coordination information to the second BBU, the first coordination information can be transmitted through the wired link between the first RRU and the second RRU, to avoid impact, on validity and timeliness of the first coordination information, caused by congestion occurred on an X2 interface between the first BBU and the second BBU and a transmission delay of an external transmission network, thereby improving transmission performance of coordination information between the BBUs.

Optionally, after the first BBU determines, based on the preset transmission link information, the transmission link corresponding to the second BBU, the method further includes the first BBU sends indication information to the first RRU, where the indication information is used to indicate the first RRU to send the first coordination information to the second RRU through the wired link between the first RRU and the second RRU.

In this optional manner, the first RRU can distinguish, based on the indication information, whether information received from the first BBU needs to be sent to another RRU through the wired link, or needs to be converted into a radio frequency signal and transmitted. Therefore, the first RRU can have both functions of serving as a bridging RRU and sending and receiving air interface information of a mobile terminal.

Optionally, the method further includes the first BBU receives second coordination information sent by the first RRU, where the second coordination information is information sent by the second BBU to the first BBU through the transmission link.

In this optional manner, the first BBU can receive the second coordination information from the second BBU through the wired link between the first RRU and the second RRU, to avoid impact, on validity and timeliness of the second coordination information, caused by the congestion occurred on the X2 interface between the first BBU and the second BBU and the transmission delay of the external transmission network, thereby improving the transmission performance of the coordination information between the BBUs.

According to a second aspect, this application provides an information transmission method, where the method includes a first RRU receives first coordination information sent by a first BBU, where the first coordination information is information sent by the first BBU to a second BBU. The first RRU sends the first coordination information to a second RRU through a wired link between the first RRU and the second RRU, where the first RRU belongs to the first BBU, the second RRU belongs to the second BBU, and the first RRU is connected to the second RRU through the wired link.

Based on the information transmission method provided in this application, the wired link is established between the first RRU belonging to the first BBU and the second RRU belonging to the second BBU, to provide a wired transmission link for exchange of coordination information between the first BBU and the second BBU. Therefore, when the first BBU sends the first coordination information to the second BBU, the first coordination information can be transmitted through the wired link between the first RRU and the second RRU, to avoid impact, on validity and timeliness of the first coordination information, caused by congestion occurred on an X2 interface between the first BBU and the second BBU and a transmission delay of an external transmission network, thereby improving transmission performance of coordination information between the BBUs.

Optionally, the method further includes the first RRU receives indication information sent by the first BBU, where the indication information is used to indicate the first RRU to send the first coordination information to the second RRU through the wired link between the first RRU and the second RRU.

In this optional manner, the first BBU can receive second coordination information from the second BBU through the wired link between the first RRU and the second RRU, to avoid impact, on validity and timeliness of the second coordination information, caused by the congestion occurred on the X2 interface between the first BBU and the second BBU and the transmission delay of the external transmission network, thereby improving the transmission performance of the coordination information between the BBUs.

Optionally, the method further includes the first RRU receives, from the wired link between the first RRU and the second RRU, the second coordination information sent by the second RRU, where the second coordination information is information sent by the second BBU to the first BBU. The first RRU sends the second coordination information to the first BBU.

According to a third aspect, this application provides a communication apparatus. The communication apparatus may be a BBU or a chip in the BBU. The communication apparatus has a function of implementing the method according to the first aspect. The function may be implemented by hardware, or may be implemented by hardware executing corresponding software. The hardware or the software includes one or more modules corresponding to the foregoing function. The communication apparatus includes a processing unit and a communication unit. Optionally, the communication apparatus may further include a storage unit. The processing unit may receive or send information through the communication unit, and the processing unit may process the information, to enable the apparatus to implement the method according to the first aspect.

For example, the communication apparatus is a first BBU or a chip in the first BBU.

The processing unit is configured to obtain first coordination information to be sent to a second BBU. The processing unit is further configured to determine, based on preset link information, a transmission link corresponding to the second BBU, where the transmission link includes a first RRU and a second RRU, the first RRU belongs to the first BBU, the second RRU belongs to the second BBU, and the first RRU and the second RRU are connected through a wired link. The processing unit is further configured to control the communication unit to send the first coordination information to the first RRU, to send the first coordination information to the second BBU through the transmission link.

Optionally, the processing unit is further configured to after determining, based on the preset transmission link information, the transmission link corresponding to the second BBU, control the communication unit to send indication information to the first RRU. The indication information is used to indicate the first RRU to send the first coordination information to the second RRU through the wired link between the first RRU and the second RRU.

Optionally, the processing unit is further configured to control the communication unit to receive second coordination information sent by the first RRU, where the second coordination information is information sent by the second BBU to the first BBU through the transmission link between the first RRU and the second RRU.

In an optional design, when the communication apparatus is the BBU, the processing unit may be, for example, a processor, and the communication unit may be, for example, a communication interface. Optionally, the BBU further includes a storage unit, and the storage unit may be, for example, a memory. When the BBU includes the storage unit, the storage unit is configured to store computer-executable instructions, the processing unit is connected to the storage unit, and the processing unit executes the computer-executable instructions stored in the storage unit, to enable the BBU to perform the method according to the first aspect.

In another optional design, when the communication apparatus is the chip in the BBU, the processing unit may be, for example, a processor, and the communication unit may be, for example, an input/output interface, a pin, or a circuit. The processing unit may execute the computer-executable instructions stored in the storage unit, to enable the chip to perform the information transmission method according to any one of the implementations of the first aspect. Optionally, the storage unit is a storage unit inside the chip, for example, a register or a buffer, or the storage unit may be a storage unit located inside the terminal but outside the chip, for example, a read-only memory (ROM) or another type of static storage device that can store static information and instructions, or a random access memory (RAM).

For a technical effect of the communication apparatus provided in this application, refer to the technical effect of the first aspect or the implementations of the first aspect. Details are not described herein again.

According to a fourth aspect, a communication apparatus is provided, where the communication apparatus may be an RRU or a chip in the RRU. The communication apparatus has a function of implementing the method according to the second aspect. The function may be implemented by hardware, or may be implemented by hardware executing corresponding software. The hardware or the software includes one or more modules corresponding to the foregoing function. The communication apparatus includes a processing unit and a communication unit. Optionally, the communication apparatus may further include a storage unit. The processing unit may receive or send information through the communication unit, and the processing unit may process the information, to enable the apparatus to implement the method according to the second aspect.

For example, the communication apparatus is a first RRU or a chip in the first RRU.

The processing unit is configured to control the communication unit to receive first coordination information sent by a first baseband unit BBU, where the first coordination information is information sent by the first BBU to a second BBU. The processing unit is further configured to control the communication unit to send the first coordination information to a second RRU through a wired link between the first RRU and the second RRU, where the first RRU belongs to the first BBU, the second RRU belongs to the second BBU, and the first RRU is connected to the second RRU through the wired link.

Optionally, the processing unit is further configured to control the communication unit to receive indication information sent by the first BBU, where the indication information is used to indicate the first RRU to send the first coordination information to the second RRU through the wired link between the first RRU and the second RRU.

Optionally, the processing unit is further configured to control the communication unit to receive, from the wired link between the first RRU and the second RRU, second coordination information sent by the second RRU, where the second coordination information is information sent by the second BBU to the first BBU, and the processing unit is further configured to control the communication unit to send the second coordination information to the first BBU.

In an optional design, when the communication apparatus is the RRU, the processing unit may be, for example, a processor, and the communication unit may include, for example, a communication interface, a transceiver, and an antenna. Optionally, the RRU further includes the storage unit, and the storage unit may be, for example, a memory. When the RRU includes the storage unit, the storage unit is configured to store computer-executable instructions, the processing unit is connected to the storage unit, and the processing unit executes the computer-executable instructions stored in the storage unit, to enable the RRU to perform the method according to the second aspect.

In another optional design, when the communication apparatus is the chip in the RRU, the processing unit may be, for example, a processor, and the communication unit may be, for example, an input/output interface, a pin, or a circuit. The processing unit may execute the computer-executable instructions stored in the storage unit, to enable the chip to perform the information transmission method according to any one of the implementations of the first aspect. Optionally, the storage unit is a storage unit inside the chip, for example, a register or a buffer, or the storage unit may be a storage unit located inside the terminal but outside the chip, for example, a read-only memory (ROM) or another type of static storage device that can store static information and instructions, or a random access memory (RAM).

For a technical effect of the communication apparatus provided in this application, refer to the technical effect of the second aspect or the implementations of the second aspect. Details are not described herein again.

Based on any one of the first aspect to the fourth aspect, optionally, the indication information may include an identifier of the second RRU.

Based on this optional manner, when the first RRU serves as a bridging RRU of a plurality of transmission paths simultaneously, the first RRU may be accurately indicated to transmit the first coordination information to the second RRU through the wired link between the first RRU and the second RRU.

Optionally, the wired link is a fiber link based on a common public radio interface (CPRI), or a fiber link based on an ethernet CPRI (eCPRI).

In this optional manner, because a CPRI/eCPRI-based fiber link connection is usually provided between an RRU and a BBU to which the RRU belongs, and the CPRI/eCPRI-based fiber link has a high-speed and low-latency transmission feature, using a feature that a CPRI/eCPRI supports cascading can easily provide a high-performance connection between different BBUs, thereby improving information transmission performance between the BBUs.

According to a fifth aspect, an embodiment of this application provides a computer storage medium, storing a program configured to implement the method according to the first aspect. When the program is run in an apparatus, the apparatus is enabled to perform the method according to the first aspect.

According to a sixth aspect, an embodiment of this application provides a computer storage medium, storing a program configured to implement the method according to the second aspect. When the program is run in an apparatus, the apparatus is enabled to perform the method according to the second aspect.

According to a seventh aspect, an embodiment of this application provides a computer program product, where the program product includes a program, and when the program is run, the method according to the first aspect is performed.

According to an eighth aspect, an embodiment of this application provides a computer program product, where the program product includes a program, and when the program is run, the method according to the second aspect is performed.

According to a ninth aspect, this application provides a communication system, including the communication apparatus according to the third aspect and the communication apparatus according to the fourth aspect.

DETAILED DESCRIPTION OF ILLUSTRATIVE EMBODIMENTS

The terms "first", "second", and the like in the specification, claims, and the accompanying drawings of this application are used to distinguish different objects, but are not used to define a specific sequence In descriptions of this application, words such as "example" or "for example" are used to give an example, an illustration, or a description. Any embodiment or design solution described as "example" or "for example" in the embodiments of this application should not be interpreted as being more preferable or more advantageous than other implementations or design solutions. Exactly, use of the word "example" or "for example" is intended to present a relative concept in a specific manner.

Unless otherwise stated, in this specification, "/" usually represents that associated objects before and after "/" are in an "or" relationship. For example, A/B may represent A or B. The term "and/or" describes only an association relationship for describing associated objects and represents that three relationships may exist. For example, A and/or B may represent the following three cases: Only A exists, both A and B exist, and only B exists. In addition, in descriptions of this application, "a plurality of" refers to two or more.

Figure 1:
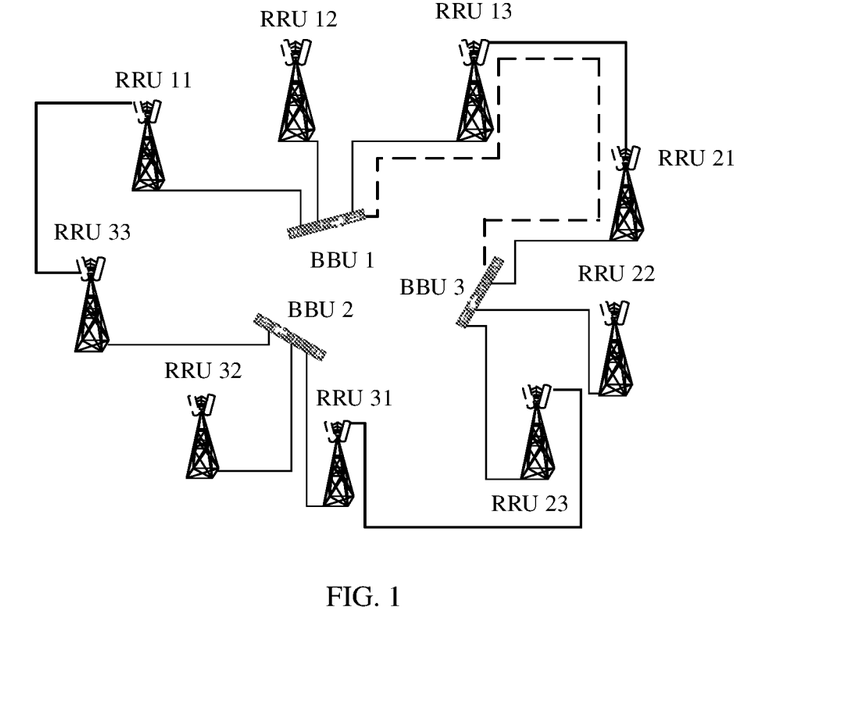
FIG. 1 is a schematic diagram of a communication system according to this application.

The information transmission method provided in this application is applicable to a communication system using a distributed base station, to implement information exchange between BBUs. For example, FIG. 1 shows a communication system according to this application, including at least two BBUs, for example, a BBU 1 and a BBU 2. Each BBU controls at least one RRU, and each RRU and a BBU to which the RRU belongs are connected in a wired manner. For example, an RRU 11, an RRU 12, and an RRU 13 belong to the BBU 1, and the RRU 11, the RRU 12, and the RRU 13 are connected to the BBU 1 through optical fibers. An RRU 21, an RRU 22, and an RRU 23 belong to the BBU 2, and the RRU 21, the RRU 22, and the RRU 23 are connected to the BBU 2 through optical fibers. The RRU 31, an RRU 32, and an RRU 33 belong to a BBU 3, and the RRU 31, the RRU 32, and the RRU 33 are connected to the BBU 3 through optical fibers. When an optical fiber is used for connection, an interface between an RRU and a BBU to which the RRU belongs is an internal interface based on a fiber link, that is, a CPRI or an eCPRI. The CPRI/eCPRI is specification of an interface between a radio equipment control center (REC) and radio equipment (RE) inside a wireless base station. That is, in a distributed base station, the REC functions as a BBU and the RE functions as an RRU.

In this application, a wired link is established between two RRUs that belong to different BBUs, to provide a wired transmission link for information exchange between the different BBUs. For example, for the BBU 1 and the BBU 2, a wired link may be established between the RRU 13 and the RRU 21. In this way, when the BBU 1 and the BBU 2 exchange coordination information, the coordination information can be transmitted through the wired link (that is, a transmission link shown by a dashed line in FIG. 1) between the RRU 13 and the RRU 21. This avoids impact on timeliness and validity of the coordination information caused by X2 interface congestion and a transmission delay of an external transmission network when the coordination information is transmitted through an X2 interface between the BBU 1 and the BBU 2 and through the external transmission network.

In this embodiment of this application, assuming that one BBU is one cell, a wired transmission link between one BBU and each neighboring cell of the BBU may be established for the BBU. For example, the BBU 1, the BBU 2, and the BBU 3 are cells neighboring to one another, and a wired transmission link between the BBU 1 and the BBU 2, a wired transmission link between the BBU 1 and the BBU 3, and a wired transmission link between the BBU 3 and the BBU 2 may be established.

In a possible implementation, for two neighboring BBUs, two RRUs that are neighboring to each other in a physical location may be selected to establish a wired link. For example, as shown in FIG. 1, for the BBU 1 and the BBU 2, the RRU 13 is neighboring to the RRU 21. In this case, the RRU 13 and the RRU 21 may be used as bridging RRUs to establish a wired link between the RRU 13 and the RRU 21. For the BBU 1 and the BBU 3, the RRU 11 is neighboring to the RRU 33. In this case, the RRU 11 and the RRU 33 may be used as bridging RRUs to establish a wired link between the RRU 11 and the RRU 33. For the BBU 2 and the BBU 3, the RRU 23 is neighboring to the RRU 31. In this case, the RRU 23 and the RRU 31 may be used as bridging RRUs to establish a wired link between the RRU 23 and the RRU 31. The bridging RRU is an RRU that provides a wired transmission path for a BBU to which the bridging RRU belongs and a neighboring cell of the BBU to which the bridging RRU belongs.

Alternatively, in another possible implementation, for each BBU, one RRU controlled by the BBU may be selected as a bridging RRU, and is connected to one RRU controlled by each neighboring cell of the BBU through a wired link. For example, for the BBU 1, the RRU 11 may be selected as a bridging RRU, for the BBU 2, the RRU 21 may be selected as a bridging RRU, and for the BBU 3, the RRU 31 may be selected. Therefore, a wired link may be established between the RRU 11 and the RRU 21, a wired link may be established between the RRU 11 and the RRU 31, and a wired link may be established between the RRU 21 and the RRU 31.

For example, a wired link between two RRUs that belong to different BBUs may also be a fiber link, for example, a CPRI-based fiber link or an eCPRI-based fiber link. Because a CPRI/eCPRI-based fiber link connection is usually provided between an RRU and a BBU to which the RRU belongs, and the CPRI/eCPRI-based fiber link has a high-speed and low-latency transmission feature, using a feature that a CPRI/eCPRI supports cascading can easily provide a high-performance connection between different BBUs, thereby improving information transmission performance between the BBUs.

Figure 2A:
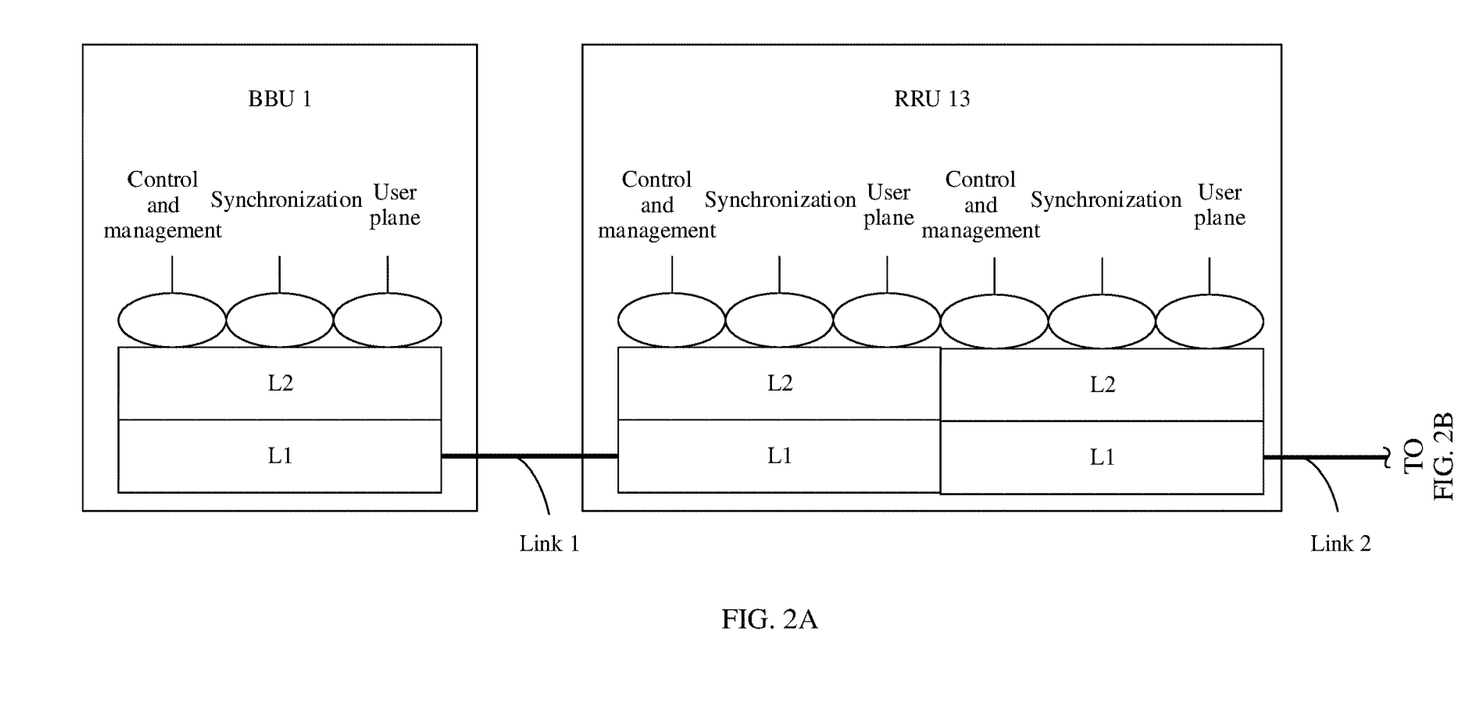
FIG. 2A and FIG. 2B are a schematic diagram of a cascading structure according to this application.
Figure 2B:
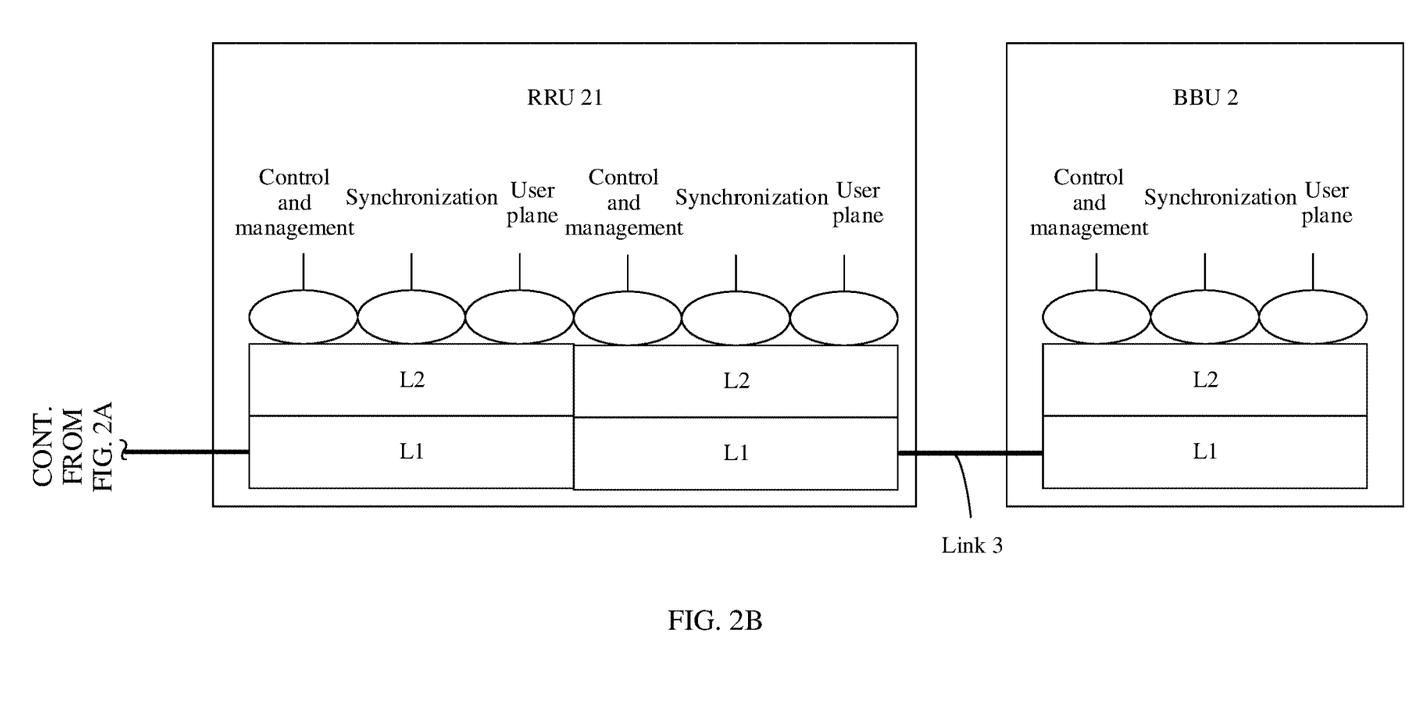

A layer 1 (L1) or layer 2 (L2) protocol is usually defined for the CPRI/eCPRI, used to transmit control and management information, synchronization information, and user plane information. For example, when a CPRI-based fiber link is established between the RRU 13 and the RRU 21, a cascading structure between the BBU 1, the RRU 13, the RRU 21, and the BBU 2 may be shown in FIG. 2A and FIG. 2B. In FIG. 2A and FIG. 2B, a CPRI-based fiber link between the BBU 1 and the RRU 13 is marked as link 1, and a CPRI-based fiber link between the BBU 2 and the RRU 21 is marked as link 2. A CPRI-based fiber link between the RRU 21 and the RRU 13 is marked as link 3.

In this application, the communication system shown in FIG. 1 may be any communication system that uses a distributed base station, including a communication system that supports a third generation (3G) mobile communication technology, a communication system that supports a fourth generation (4G) access technology, for example, a long term evolution (LTE) access technology, or a communication system that supports a fifth generation (5G) access technology, for example, a new radio (NR) access technology, or may include a communication system that supports a plurality of wireless technologies, such as a future-oriented communication technology.

Figure 3:
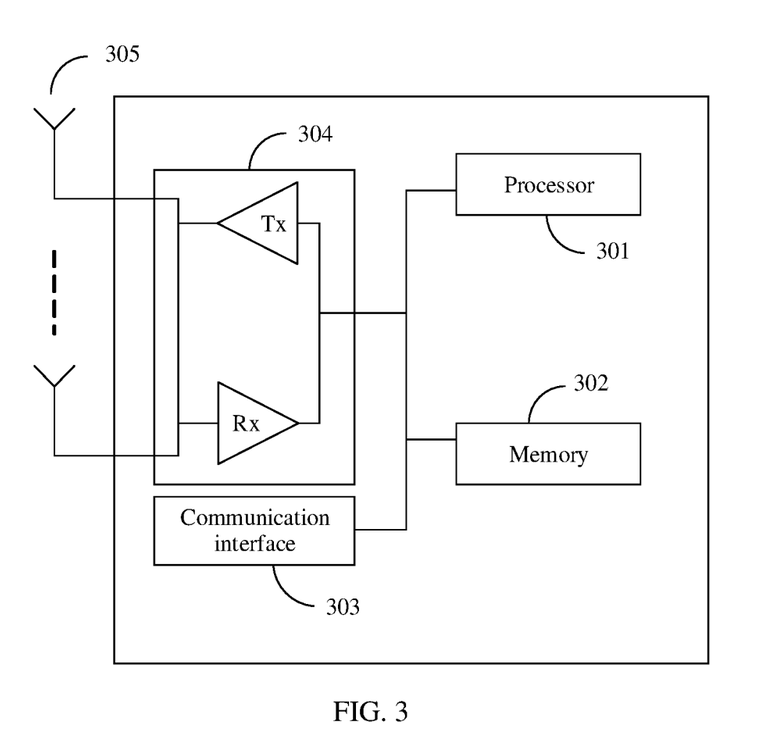
FIG. 3 is a schematic structural diagram of an RRU according to this application.

Refer to FIG. 3. An RRU in this application may include at least one processor 301, at least one memory 302, and at least one communication interface 303. The processor 301, the memory 302, and the communication interface 303 are connected through, for example, a bus. An antenna 305 is connected to a transceiver 304. The communication interface 303 may include an internal interface between the RRU and a BBU to which the RRU belongs, and an internal interface, for example, a CPRI/eCPRI, between the RRU and another RRU belonging to a different BBU. The communication interface 303 is configured to complete, under control of the processor 301, transmission of a digital signal with the BBU to which the RRU belongs or with the another RRU belonging to the different BBU.

The processor 301 in this embodiment of this application may include at least one of the following types: a general-purpose central processing unit (CPU), a digital signal processor (DSP), a microprocessor, or an application-specific integrated circuit (ASIC), a microcontroller unit (MCU), a field programmable gate array (FPGA), or an integrated circuit configured to implement a logic operation. For example, the processor 301 may be a single-core (single-CPU) processor or a multi-core (multi-CPU) processor. The at least one processor 301 may be integrated in one chip or located in a plurality of different chips.

The memory 302 in this embodiment of this application may include at least one of the following types: a read-only memory (ROM) or another type of static storage device that can store static information and instructions, a random access memory (RAM) or another type of dynamic storage device that can store information and instructions, or an electrically erasable programmable read-only memory (EE- PROM). In some scenarios, the memory may alternatively be a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 302 may exist independently, and is connected to the processor 301. Optionally, the memory 302 may alternatively be integrated with the processor 301, for example, integrated into one chip. The memory 302 can store a program for executing technical solutions in the embodiments of this application, and execution is controlled by the processor 301. Various types of executed computer program code may also be considered as drivers of the processor 301. For example, the processor 301 is configured to execute the computer program code stored in the memory 302, to implement the technical solutions in the embodiments of this application.

Optionally, the RRU provided in this application may further include at least one transceiver 304 and one or more antennas 305. The transceiver 304 may be configured to support receiving or sending of an air interface signal between the RRU and a mobile terminal, and the transceiver 304 may be connected to the antenna 305. The transceiver 304 includes a transmitter Tx and a receiver Rx. For example, the one or more antennas 305 may receive an air interface signal, and the receiver Rx of the transceiver 304 is configured to receive the air interface signal from the antenna, convert the air interface signal into a digital baseband signal or a digital intermediate frequency signal, and provide the digital baseband signal or the digital intermediate frequency signal to the processor 301, so that the processor 301 performs further processing, for example, demodulation processing and decoding processing, on the digital baseband signal or the digital intermediate frequency signal. In addition, the transmitter Tx in the transceiver 304 is further configured to receive a modulated digital baseband signal or digital intermediate frequency signal from the processor 301, convert the modulated digital baseband signal or digital intermediate frequency signal into an air interface signal, and send the air interface signal through the one or more antennas 305. The receiver Rx may selectively perform one or more levels of frequency down-mixing processing and analog-to-digital conversion processing on the air interface signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the air interface signal. A sequence of the frequency up-mixing processing and the digital-to-analog conversion processing is adjustable. The digital baseband signal and the digital intermediate frequency signal may be collectively referred to as digital signals.

Figure 4:
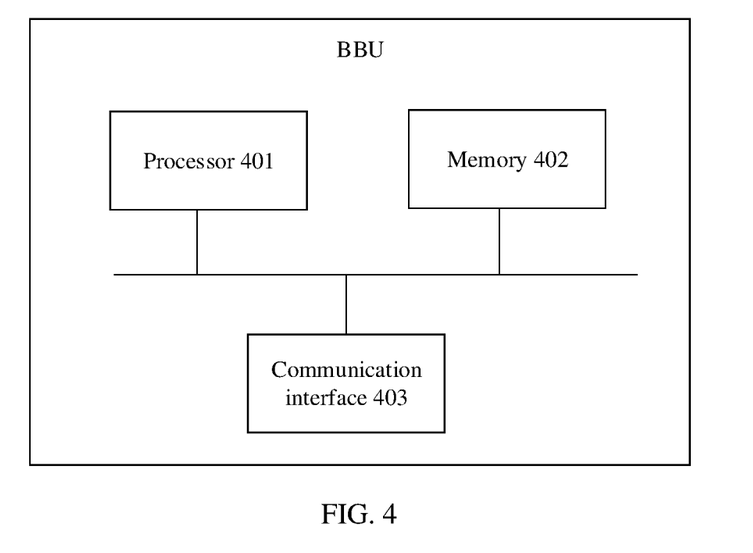
FIG. 4 is a schematic structural diagram of a BBU according to this application.

Refer to FIG. 4. A BBU in this application may include at least one processor 401, at least one memory 402, and at least one communication interface 403. The processor 401, the memory 402, and the communication interface 403 are connected through, for example, a bus. The communication interface 403 is configured to enable the BBU to connect to another communication device through a communication link. For example, the communication interface 403 includes a CPRI/eCPRI, and the BBU is connected, based on the CPRI/eCPRI through an optical fiber, to an RRU belonging to the BBU. In addition, the communication interface 403 includes an X2 interface, and the BBU is connected to another BBU based on the X2 interface through an external transmission network. In the embodiments of this application, the connection may include various types of interfaces, transmission lines, buses, or the like. This is not limited in the embodiments.

The processor 401 in this embodiment of this application may include at least one of the following types: a CPU, a DSP, a microprocessor, an ASIC, an MCU, an FPGA, or an integrated circuit configured to implement a logic operation. For example, the processor 401 may be a single-core processor or a multi-core processor. The at least one processor 401 may be integrated in one chip or located in a plurality of different chips.

The memory 402 in this embodiment of this application may include at least one of the following types: a ROM or another type of static storage device that can store static information and instructions, a random access memory RAM or another type of dynamic storage device that can store information and instructions, or an EEPROM. In some scenarios, the memory may alternatively be a CD-ROM or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 402 may exist independently, and is connected to the processor 401. Optionally, the memory 402 may alternatively be integrated with the processor 401, for example, integrated into one chip. The memory 402 can store a program for executing the technical solutions in the embodiments of this application, and execution is controlled by the processor 401. Various types of executed computer program code may also be considered as drivers of the processor 401. For example, the processor 401 is configured to execute the computer program code stored in the memory 402, to implement the technical solutions in the embodiments of this application. For example, the processor 401 performs baseband signal processing, monitoring and management of modules of the BBU, forwarding and routing decision, link information maintenance, and transmission link control.

The following describes an information transmission method provided in this application by using an example in which two BBUs transmit coordination information to each other. For ease of differentiation, the two BBUs are respectively referred to as a first BBU and a second BBU, and coordination information sent by the first BBU to the second BBU is referred to as first coordination information, and coordination information sent by the second BBU to the first BBU is referred to as second coordination information. In this embodiment of this application, the first coordination information may be various types of information that the first BBU needs to send to the second BBU in a data transmission process, and is used by the first BBU and the second BBU to coordinate to complete the data transmission process. Similarly, the second coordination information may be various types of information that the second BBU needs to send to the second BBU in a data transmission process, and is used by the first BBU and the second BBU to coordinate to complete the data transmission process.

Figure 5:
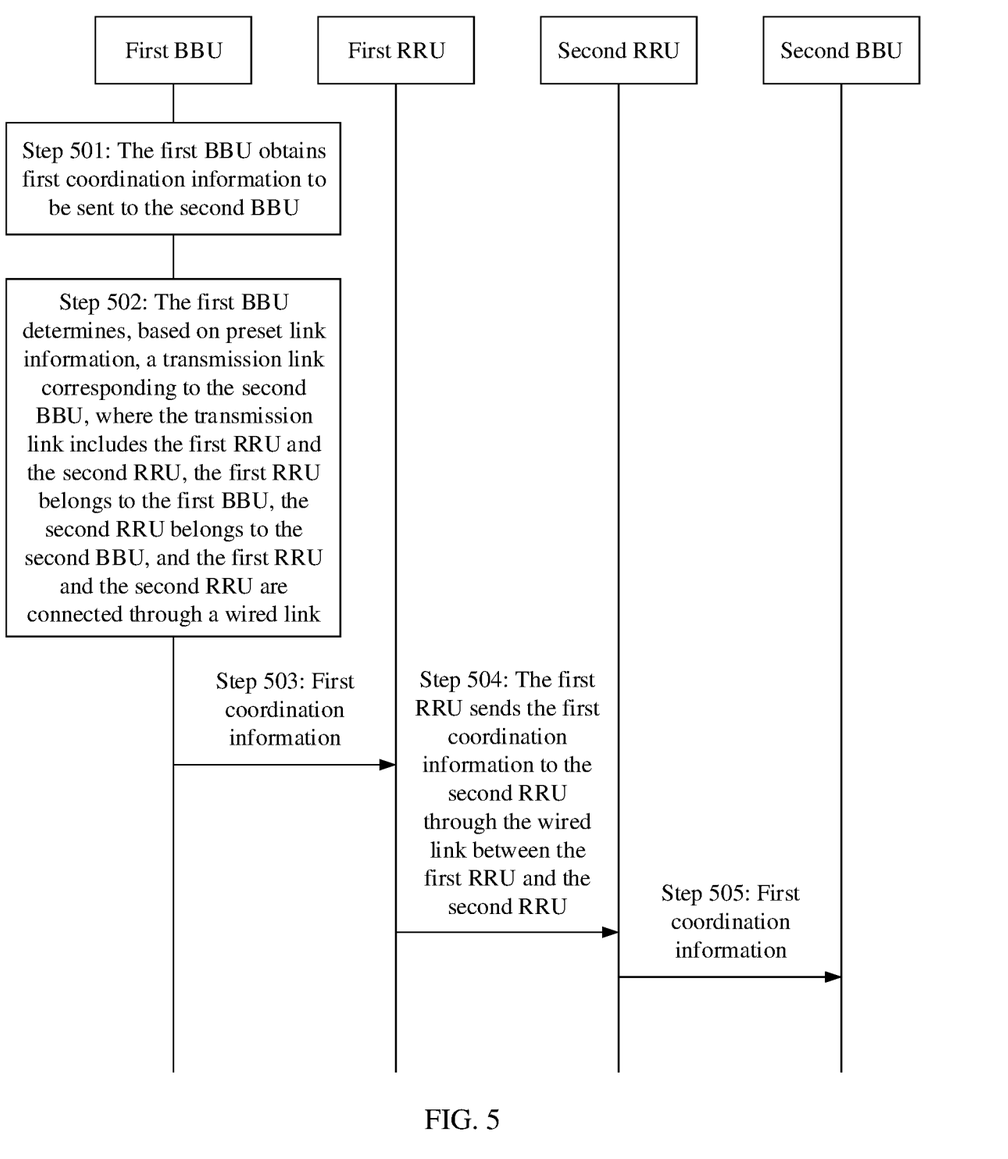
FIG. 5 is a flowchart of an embodiment of an information transmission method according to this application.

FIG. 5 is a flowchart of an embodiment of an information transmission method according to this application. The method includes the following steps.

Step 501: A first BBU obtains first coordination information to be sent to a second BBU.

Step 502: The first BBU determines, based on preset link information, a transmission link corresponding to the second BBU, where the transmission link includes a first RRU and a second RRU, the first RRU belongs to the first BBU, the second RRU belongs to the second BBU, and the first RRU and the second RRU are connected through a wired link.

In this embodiment of this application, the first BBU maintains the preset link information, and the link information includes endpoint information of at least one transmission path. For example, the link information includes a transmission link between the first BBU and the second BBU, and endpoint information of the transmission link may include an identifier of the first RRU belonging to the first BBU, an identifier of the second BBU, and an identifier of the second RRU belonging to the second BBU. Therefore, the first BBU can determine that the first RRU and the second RRU are bridging RRUs in the transmission link corresponding to the second BBU, and the first BBU may send the first coordination information to the second BBU through the wired link between the first RRU and the second RRU.

For example, the BBU 1 shown in FIG. 1 is used as an example. Link information maintained in the BBU 1 may be shown in Table 1.

TABLE 1

| Identifier of a bridging RRU of the BBU 1 | Identifier of a neighboring cell | Identifier of a bridging RRU of the neighboring cell |
|---|---|---|
| RRU 13 | BBU 2 | RRU 21 |
| RRU 11 | BBU 3 | RRU 33 |

It is assumed that the BBU 1 obtains coordination information to be sent to the BBU 2. In this case, the BBU 1 can determine, based on the link information shown in Table 1, a transmission link corresponding to the BBU 2. That is, the transmission link includes the RRU 13 and the RRU 21, and the RRU 13 and the RRU 21 are connected through a wired link. In other words, the BBU 1 can determine that the coordination information may be sent to the BBU 2 through the wired link between the RRU 13 and the RRU 21.

Step 503: The first BBU sends the first coordination information to the first RRU.

Step 504: The first RRU sends the first coordination information to the second RRU through the wired link between the first RRU and the second RRU.

It may be understood that after determining a transmission path corresponding to the second BBU, the first BBU can send the first coordination information to a bridging RRU, namely, the first RRU, of the first BBU in the transmission path, so that the first RRU sends the first coordination information to the second BBU through the wired link between the first RRU and the second RRU.

In a possible implementation, if the first RRU has both functions of serving as a bridging RRU and sending and receiving air interface information of a mobile terminal, the first BBU may include indication information when sending the first coordination information, that is, send the indication information to the first RRU, to indicate the first RRU to send the first coordination information to the second RRU through the wired link between the first RRU and the second RRU. This helps the first RRU distinguish whether information received from the first BBU needs to be sent to another RRU through a wired link, or needs to be converted into a radio frequency signal and transmitted. In this case, if information carrying the indication information is received from the first BBU, the first RRU does not need to perform radio frequency signal conversion processing on the information, but directly forwards the information to the second RRU through the wired link between the first RRU and the second RRU. If information not carrying the indication information is received from the first BBU, the first RRU may perform radio frequency signal conversion processing on the information, and transmit the information through an antenna.

Optionally, if the first RRU serves as a bridging RRU of a plurality of transmission paths, the indication information may carry an identifier of the second RRU, so that the first RRU determines that the first coordination information needs to be sent to the second RRU instead of another RRU that establishes a wired link to the first RRU. For example, the RRU 11 serves as a bridging RRU, and establishes wired links to both the RRU 21 belonging to the BBU 2 and the RRU 31 belonging to the BBU 3. When the BBU 1 sends, to the RRU 11, the coordination information to be sent to the BBU 2, the coordination information carries an identifier of the RRU 21. Therefore, the RRU 11 can determine, based on the identifier of the RRU 21, to send the coordination information to the RRU 21 through the wired link between the RRU 11 and the RRU 21.

Step 505: The second RRU sends the first coordination information to the second BBU.

After receiving, from the wired link between the first RRU and the second RRU, the first coordination message sent by the first RRU, the second RRU can forward the first coordination message to the second BBU, so that the second BBU receives, based on the wired link between the first RRU and the second RRU, the first coordination information sent by the first BBU, thereby avoiding impact, on validity and timeliness of the second coordination information, caused by congestion occurred on the X2 interface and a transmission delay of an external transmission network that are occurred when the second BBU receives the first coordination information through the X2 interface between the second BBU and the first BBU.

In this embodiment of this application, if the second RRU receives, from the wired link between the second RRU and the another RRU, information sent by the another RRU, the second RRU may not need to perform baseband signal conversion and processing on the received information, but may directly send the received information to the second BBU to which the second RRU belongs. If the second RRU receives air interface information, the second RRU needs to perform baseband signal conversion and processing on the received air interface information, and send a baseband signal obtained after the processing to the second BBU.

Figure 6A:
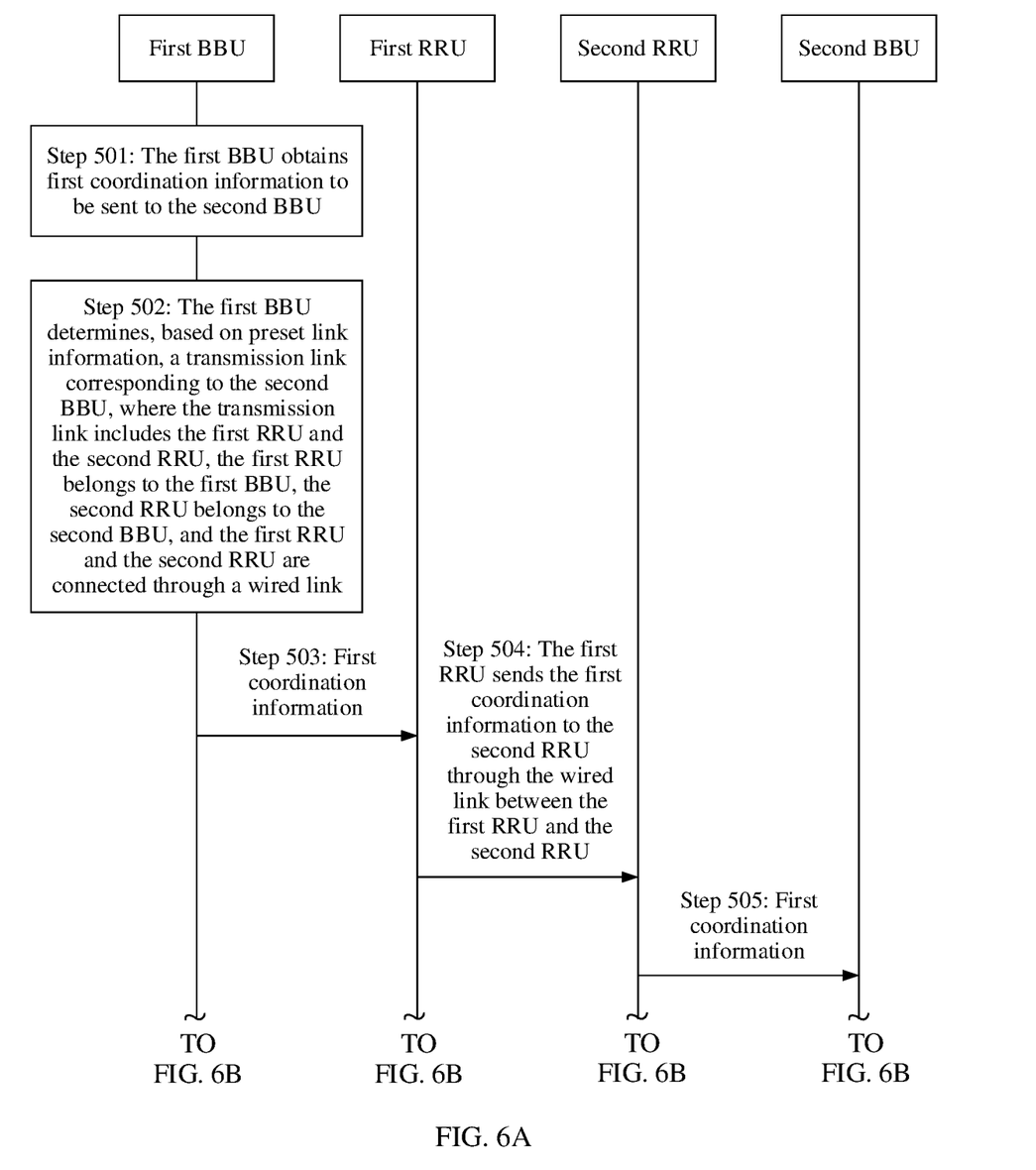
FIG. 6A and FIG. 6B are a flowchart of another embodiment of an information transmission method according to this application.
Figure 6B:
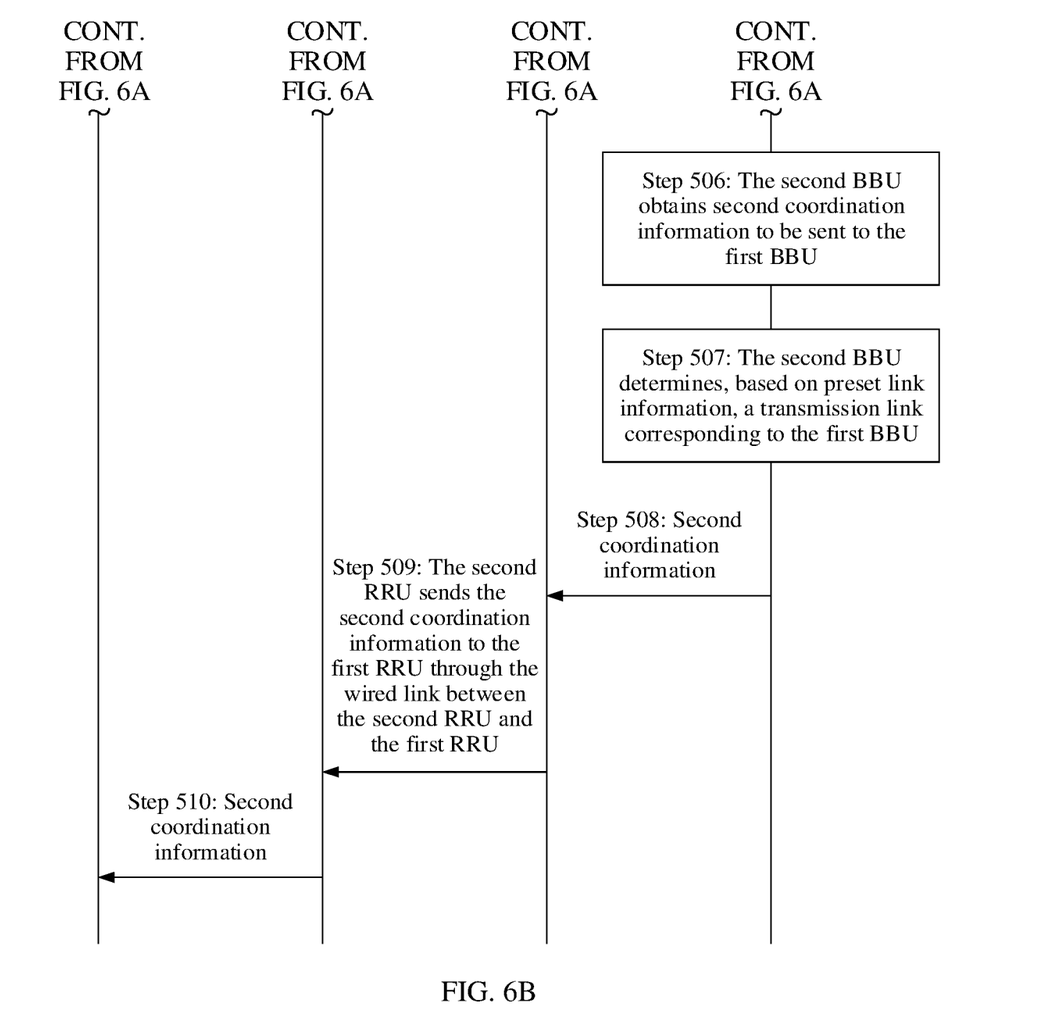

Similarly, a manner in which the second BBU sends the second coordination information to the first BBU is the same as a manner in which the first BBU sends the first coordination information to the second BBU. For example, FIG. 6A and FIG. 6B are a flowchart of another embodiment of an information transmission method according to this application. Based on FIG. 5, the method further includes the following steps.

Step 506: The second BBU obtains second coordination information to be sent to the first BBU.

Step 507: The second BBU determines, based on preset link information, a transmission link corresponding to the first BBU.

The preset link information is link information maintained by the second BBU. It may be understood that the transmission link also includes the first RRU and the second RRU.

Step 508: The second BBU sends the second coordination information to the second RRU.

Step 509: The second RRU sends the second coordination information to the first RRU through the wired link between the second RRU and the first RRU.

That is, after determining a transmission path corresponding to the first BBU, the second BBU can send the second coordination information to a bridging RRU, namely, the second RRU, of the second BBU in the transmission path, so that the second RRU sends the second coordination information to the first BBU through the wired link between the second RRU and the first RRU.

Step 510: The first RRU sends the second coordination information to the first BBU.

After receiving, from the wired link between the first RRU and the second RRU, the second coordination message sent by the second RRU, the first RRU can forward the second coordination message to the first BBU, so that the first BBU receives, based on the wired link between the first RRU and the second RRU, the second coordination information sent by the second BBU, thereby avoiding impact, on validity and timeliness of the second coordination information, caused by congestion occurred on an X2 interface and a transmission delay of the external transmission network that are occurred when the first BBU receives the second coordination information through the X2 interface between the first BBU and the second BBU.

Similarly, for the first RRU, if information sent by another RRU is received from the wired link between the first RRU and the another RRU, the first RRU may not need to perform baseband signal conversion and processing on the received information, but may directly send the received information to the first BBU to which the first RRU belongs. If the first RRU receives air interface information, the first RRU needs to perform baseband signal conversion and processing on the received air interface information, and send a baseband signal obtained after the processing to the first BBU.

That is, according to the information transmission method provided in this application, the wired link is established between the first RRU belonging to the first BBU and the second RRU belonging to the second BBU, to provide the wired transmission path for the first BBU and the second BBU, so that the first BBU and the second BBU can transmit coordination information based on the wired transmission path, thereby improving transmission performance of the coordination information between the first BBU and the second BBU, and improving validity and timeliness of the coordination information.

The information transmission method provided in this embodiment of this application can be applicable to a plurality of BBU interaction scenarios.

For example, the information transmission method provided in this embodiment of this application may be applied to a coordinated multipoint (CoMP) transmission scenario. In the CoMP transmission scenario, one cell usually needs to be used as a primary cell to be responsible for control and data transmission of a mobile terminal, and another cell is used as a secondary cell to assist the primary cell in providing the data transmission for the terminal. Therefore, coordination information needs to be exchanged between the primary cell and the secondary cell, so that the primary cell and the secondary cell coordinate to complete the data transmission of the mobile terminal.

For example, with reference to the foregoing examples in FIG. 5, and FIG. 6A and FIG. 6B, if the first BBU is a primary cell in the CoMP transmission scenario, the second BBU is a secondary cell in CoMP. In this case, the first coordination information may include resource scheduling information provided by the primary cell for the secondary cell, to-be-sent user data, and the like. The second coordination information may include channel state information between the mobile terminal and the secondary cell that is provided by the secondary cell for the primary cell, and the like.

Because the CoMP transmission scenario has high requirements on a transmission bandwidth and delay of the coordination information, usually, the primary cell and the secondary cell need to be co-sited, that is, a BBU of the primary cell and a BBU of the secondary cell are set up in a same equipment room. In addition, CoMP transmission can be implemented only when the two BBUs are directly connected through an internal interface. However, after the information transmission method provided in this application is used, even if the first BBU and the second BBU are not co-sited, the first BBU and the second BBU may still implement high-speed and low-latency transmission through the wired link between the first RRU and the second RRU, so that the requirements on the transmission bandwidth and delay of the coordination information in the CoMP transmission scenario are met.

The information transmission method provided in the embodiments of this application may be further applied to a cell handover scenario. When a mobile terminal moves from coverage of a source cell to coverage of a target cell, a serving cell of the mobile terminal needs to be handed over from the source cell to the target cell. In this case, in a cell handover process, the source cell needs to send data that is not transferred to the mobile terminal to the target cell, so that the target cell continues to provide data transmission for the mobile terminal. That is, in a cell handover scenario, the source cell and the target cell coordinate to complete data transmission of the mobile terminal.

For example, with reference to the foregoing examples in FIG. 5, and FIG. 6A and FIG. 6B, assuming that the first BBU is a source cell and the second BBU is a target cell, the first coordination information may include data that is not transferred by the source cell to the mobile terminal. The data that is not transferred by the source cell to the mobile terminal generally includes two types. The first type of data is data that has been received by the source cell from a core network but has not been processed at a packet data convergence protocol (PDCP) layer. The second type of data is data that has been received by the source cell from the core network and has been processed at a PDCP layer, but is still in a transmit buffer and has not been sent, or has been sent but has not been acknowledged.

If the source cell and the target cell complete transmission of the first type of data, handover from the source cell to the target cell is referred to as seamless handover. In addition, if the source cell and the target cell further complete transmission of the second type of data while implementing the seamless handover, the handover from the source cell to the target cell is referred to as hitless handover. In addition, the hitless handover between the source cell and the target cell can provide relatively high transmission quality of service (QoS) and user experience, but also has a relatively high requirement on a transmission delay between the source cell and the target cell. However, after the information transmission method provided in this application is used, the first BBU and the second BBU may implement high-speed and low-latency transmission through the wired link between the first RRU and the second RRU, so that a transmission delay requirement of the hitless handover can be met, thereby ensuring transmission QoS and user experience in the cell handover process.

For cell handover in a high-speed railway scenario, as locomotives pass through different cells, a large quantity of mobile terminals need to frequently perform cell handover. Therefore, a large amount of user data needs to be exchanged between BBUs. After the information transmission method provided in this application is used, congestion of an X2 interface between the BBUs is avoided, and impact of a transmission delay of an external transmission network on transmission performance of the first type of data and the second type of data is also avoided, thereby improving a success rate of cell handover in the high-speed railway scenario.

Figure 7:
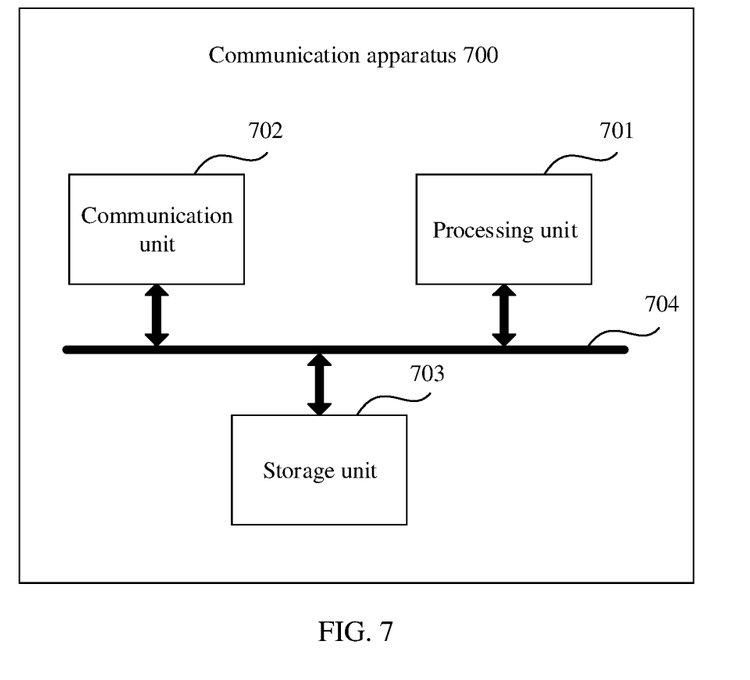
FIG. 7 is a schematic diagram of a communication apparatus structure according to this application.

The following describes a communication apparatus provided in the embodiments of this application. As shown in FIG. 7, the communication apparatus 700 includes a processing unit 701 and a communication unit 702. Optionally, the apparatus further includes a storage unit 703. The processing unit 701, the communication unit 702, and the storage unit 703 are connected through a communication bus 704.

The communication unit 702 may be an apparatus having a transceiver function, and is configured to communicate with a BBU, an RRU, and a mobile terminal.

The storage unit 703 may include one or more memories, and the memory may be a component that is in one or more devices or circuits and that is configured to store a program or data.

The storage unit 703 may exist independently, and is connected to the processing unit 701 through the communication bus 704. Alternatively, the storage unit 703 may be integrated with the processing unit 701.

The communication apparatus 700 may be used in a BBU, an RRU, a circuit, a hardware component, or a chip.

The communication apparatus 700 may be a BBU in the embodiments of this application, for example, the first BBU, the second BBU, the BBU 1, the BBU 2, and the BBU 3. A schematic diagram of the BBU may be shown in FIG. 2A and FIG. 2B. Optionally, the communication unit 702 of the communication apparatus 700 may include a communication interface of the BBU, for example, the communication interface 403 shown in FIG. 4. The processing unit 701 may be the processor 401 shown in FIG. 4. The storage unit 703 may be the memory 402 shown in FIG. 4.

Alternatively, the communication apparatus 700 is a chip in a BBU in the embodiments of this application, for example, a chip in the first BBU or a chip in the second BBU. The communication unit 702 may be an input/output interface, a pin, a circuit, or the like. Optionally, the storage unit 703 may store a computer-executable instruction for performing the method on a BBU side, to enable the processing unit 701 to perform the method performed by the BBU in the foregoing embodiments. The storage unit 703 may be a ROM or another type of static storage device that can store static information and instructions, and the storage unit 703 may be independent of the processing unit 701.

When the communication apparatus 700 is the BBU or the chip in the BBU in the embodiments of this application, the communication apparatus 700 may implement the method performed by the BBU in the foregoing embodiments. For example, an example in which the communication apparatus 700 is the first BBU or the chip in the first BBU is used.

The processing unit 701 is configured to obtain first coordination information to be sent to a second BBU. The processing unit 701 is further configured to determine, based on preset link information, a transmission link corresponding to the second BBU, where the transmission link includes a first RRU and a second RRU, the first RRU belongs to the first BBU, and the second RRU belongs to the second BBU. The first RRU and the second RRU are connected through a wired link. The processing unit 701 is further configured to control the communication unit 702 to send the first coordination information to the first RRU, to send the first coordination information to the second BBU through the transmission link.

Optionally, the processing unit 701 is further configured to after determining, based on the preset transmission link information, the transmission link corresponding to the second BBU, control the communication unit 702 to send indication information to the first RRU. The indication information is used to indicate the first RRU to send the first coordination information to the second RRU through the wired link between the first RRU and the second RRU.

Optionally, the indication information is an identifier of the second RRU.

Optionally, the processing unit 701 is further configured to control the communication unit 702 to receive second coordination information sent by the first RRU, where the second coordination information is information sent by the second BBU to the first BBU through the transmission link between the first RRU and the second RRU.

Optionally, the wired link between the first RRU and the second RRU is a CPRI-based fiber link or an eCPRI-based fiber link.

Alternatively, the communication apparatus 700 may be an RRU in the embodiments of this application, for example, the first RRU, the second RRU, the RRU 11, the RRU 12, ..., or the RRU 33. A schematic diagram of the RRU may be shown in FIG. 3. Optionally, the communication unit 702 of the communication apparatus 700 may include a communication interface, a transceiver, and an antenna that are of the RRU, for example, the communication interface 303, the transceiver 304, and the antenna 305 shown in FIG. 3. The processing unit 701 may be the processor 301 shown in FIG. 3. The storage unit 703 may be the memory 302 shown in FIG. 3.

Alternatively, the communication apparatus 700 may be a chip in an RRU in the embodiments of this application, for example, a chip in the first RRU or a chip in the second RRU. The communication unit 702 may be an input/output interface, a pin, a circuit, or the like. Optionally, the storage unit 703 may store a computer-executable instruction for performing the method on an RRU side, to enable the processing unit 701 to perform the method performed by the RRU in the foregoing embodiments. The storage unit 703 may be a ROM or another type of static storage device that can store static information and instructions, and the storage unit 703 may be independent of the processing unit 701. Optionally, with development of wireless communication technologies, a transceiver and a network interface may be integrated into the communication apparatus 700. For example, the communication unit 703 integrates the transceiver 203 and the network interface 204.

When the communication apparatus 700 is the RRU or the chip in the RRU in the embodiments of this application, the communication apparatus 700 may implement the method performed by the RRU in the foregoing embodiments. For example, an example in which the communication apparatus 700 is the first RRU or the chip in the first RRU is used.

The processing unit 701 is configured to control the communication unit 702 to receive first coordination information sent by a first baseband unit BBU, where the first coordination information is information sent by the first BBU to a second BBU. The processing unit 701 is further configured to control the communication unit 702 to send the first coordination information to a second RRU through a wired link between the first RRU and the second RRU, where the first RRU belongs to the first BBU, and the second RRU belongs to the second BBU. The first RRU is connected to the second RRU through a wired link.

Optionally, the processing unit 701 is further configured to control the communication unit 702 to receive indication information sent by the first BBU, where the indication information is used to indicate the first RRU to send the first coordination information to the second RRU through the wired link between the first RRU and the second RRU.

Optionally, the indication information is an identifier of the second RRU.

Optionally, the processing unit 701 is further configured to control the communication unit 702 to receive, from the wired link between the first RRU and the second RRU, second coordination information sent by the second RRU, where the second coordination information is information sent by the second BBU to the first BBU, and the processing unit 701 is further configured to control the communication unit 702 to send the second coordination information to the first BBU.

Optionally, the wired link between the first RRU and the second RRU is a CPRI-based fiber link or an eCPRI-based fiber link.

An embodiment of this application further provides a computer-readable storage medium. The methods described in the foregoing embodiments may be all or partially implemented by using software, hardware, firmware, or any combination thereof. If the methods are implemented in the software, functions used as one or more instructions or code may be stored in the computer-readable medium or transmitted on the computer-readable medium. The computer-readable medium may include a computer storage medium and a communication medium, and may further include any medium that can transfer a computer program from one place to another. The storage medium may be any available medium accessible to a computer.

In an optional design, the computer-readable medium may include a RAM, a ROM, an EEPROM, a CD-ROM or another optical disc storage device, a magnetic disk storage device or another magnetic storage device, or any other medium that can be configured to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in the software, the methods may be all or partially implemented in a form of the computer program product. The computer program product includes one or more computer instructions. When the foregoing computer program instructions are loaded and executed on a computer, the procedures or functions described in the foregoing method embodiments are all or partially generated. The computer may be a general-purpose computer, a dedicated computer, a computer network, a network device, user equipment, or another programmable apparatus.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A communication apparatus, comprising:
   at least one processor, and
   one or more memories coupled to the at least one processor and storing programming instructions for execution by the at least one processor, the programming instructions including instructions for acting as a first baseband unit (BBU) or an apparatus applicable in the first BBU, and including instructions for:
   obtaining first coordination information to be sent to a second BBU;
   determining, based on preset link information, a transmission link corresponding to the second BBU, wherein the transmission link comprises a first remote radio unit (RRU) and a second RRU, wherein the first RRU belongs to the first BBU, wherein the second RRU belongs to the second BBU, and wherein the first RRU and the second RRU are connected through a wired link;
   sending the first coordination information to the first RRU; and
   sending indication information to the first RRU, wherein the indication information indicates to the first RRU to send the first coordination information to the second RRU through the wired link, wherein the indication information comprises an identifier of the second RRU.

2. The apparatus according to claim 1, wherein the programming instructions further include instructions for:
   receiving second coordination information from the first RRU, wherein the second coordination information is information sent from the second BBU to the first BBU through the transmission link.

3. The apparatus according to claim 1, wherein the wired link is a fiber link based on at least one of a common public radio interface (CPRI) or an ethernet common public radio interface (eCPRI).

4. The apparatus according to claim 1, wherein the first RRU is a bridging RRU for the first BBU, and wherein the second RRU is a bridging RRU for the second BBU.

5. The apparatus according to claim 4, wherein the first BBU determines, according to link information identifying the first RRU as the bridging RRU for the first BBU and further identifying the second RRU as the bridging RRU for the second BBU, the transmission link to be a transmission link corresponding to the second BBU is a bridging RRU for the first BBU, and wherein the second RRU is a bridging RRU for the second BBU.

6. The apparatus according to claim 5, wherein the first BBU maintains the link information.

7. The apparatus according to claim 1, wherein the first coordination information is information needed to be sent by the first BBU to the second BBU to coordinate completion of a data transmission process.

8. A communication apparatus, comprising:
at least one processor, and
one or more memories coupled to the at least one processor and storing programming instructions for execution by the at least one processor, the programming instructions including instructions for acting as a first remote radio unit (RRU) or an apparatus applicable in the first RRU, and including instructions for:
receiving first coordination information from a first baseband unit (BBU), wherein the first coordination information is information from the first BBU to a second BBU;
receiving indication information from the first BBU, wherein the indication information indicates to the first RRU to send the first coordination information to a second RRU through a wired link, wherein the indication information comprises an identifier of the second RRU; and
sending the first coordination information to the second RRU through the wired link between the first RRU and the second RRU according to the indication information, wherein the first RRU belongs to the first BBU, wherein the second RRU belongs to the second BBU, and wherein the first RRU is connected to the second RRU through the wired link.

9. The apparatus according to claim 8, wherein the programming instructions further include instructions for:
receiving, over the wired link, second coordination information sent by the second RRU, wherein the second coordination information is information sent from the second BBU to the first BBU; and
sending the second coordination information to the first BBU.

10. The apparatus according to claim 8, wherein the wired link is a fiber link based on at least one of a common public radio interface (CPRI) or an ethernet common public radio interface (eCPRI).

11. The apparatus according to claim 8, wherein the first RRU is a bridging RRU for the first BBU, and wherein the second RRU is a bridging RRU for the second BBU.

12. The apparatus according to claim 8, wherein the wired link is a link other than an X2 link.

13. The apparatus according to claim 8, wherein the first coordination information is information needed to be sent by the first BBU to the second BBU to coordinate completion of a data transmission process.

14. A communication system, comprising:
a first remote radio unit (RRU); and
a first baseband unit (BBU), comprising:
at least one processor; and
one or more memories storing first programming instructions executable by the at least one processor, the first programming instructions including first instructions for:
obtaining first coordination information to be sent to a second BBU;
determining, based on preset link information, a transmission link corresponding to the second BBU, wherein the transmission link comprises the first RRU and a second RRU, wherein the first RRU belongs to the first BBU, wherein the second RRU belongs to the second BBU, and wherein the first RRU and the second RRU are connected through a wired link;
sending the first coordination information to the first RRU; and
sending indication information to the first RRU, wherein the indication information indicates to the first RRU to send the first coordination information to the second RRU through the wired link, and wherein the indication information comprises an identifier of the second RRU;
wherein the first RRU comprises:
at least one processor; and
one or more memories storing second programming instructions executable by the at least one processor, the second programming instructions including second instructions for:
sending the first coordination information to a second RRU through the wired link between the first RRU and the second RRU according to the indication information.

15. The communication system according to claim 14, wherein the first programming instructions further includes first instructions for:
receiving, over the wired link, second coordination information from the second RRU, wherein the second coordination information is information from the second BBU to the first BBU; and
sending the second coordination information to the first BBU.

16. The communication system according to claim 14, wherein the first RRU is a bridging RRU for the first BBU, and wherein the second RRU is a bridging RRU for the second BBU.

17. The communication system according to claim 16, wherein the first BBU determines, according to link information identifying the first RRU as the bridging RRU for the first BBU and further identifying the second RRU as the bridging RRU for the second BBU, the transmission link to be a transmission link corresponding to the second BBU is a bridging RRU for the first BBU, and wherein the second RRU is a bridging RRU for the second BBU.

18. The communication system according to claim 17, wherein the first BBU maintains the link information.

19. The communication system according to claim 14, wherein the first coordination information is information needed to be sent by the first BBU to the second BBU to coordinate completion of a data transmission process.

20. The communication system according to claim 14, wherein the wired link is a link other than an X2 link.

* * * * *